(12) United States Patent
Heine

(10) Patent No.: US 7,172,014 B2
(45) Date of Patent: Feb. 6, 2007

(54) HEAT EXCHANGER FOR A MOTOR VEHICLE, IN PARTICULAR COOLANT/AIR COOLER

(75) Inventor: Reinhard Heine, Leutenbach (DE)

(73) Assignee: Behr GmbH & Co. KG, Stuttgart (DE)

(*) Notice: Subject to any disclaimer, the term of this patent is extended or adjusted under 35 U.S.C. 154(b) by 17 days.

(21) Appl. No.: 10/959,951

(22) Filed: Oct. 7, 2004

(65) Prior Publication Data
US 2005/0092470 A1    May 5, 2005

(30) Foreign Application Priority Data
Oct. 9, 2003  (DE) ................. 103 47 679

(51) Int. Cl.
*F28D 7/16* (2006.01)
(52) U.S. Cl. .............. 165/140; 264/219; 425/183
(58) Field of Classification Search ........ 165/140, 165/148, 149, 172, 173; 264/219; 425/183, 425/190, 195; 249/102–104
See application file for complete search history.

(56) References Cited
U.S. PATENT DOCUMENTS
4,940,086 A * 7/1990 Stay ................ 165/173
5,107,924 A * 4/1992 Herbert et al. ......... 165/173
5,160,474 A * 11/1992 Huff .................. 264/255
2003/0141047 A1* 7/2003 Lamich .............. 165/173
2004/0156478 A1* 8/2004 Appleby et al. ........ 378/147

FOREIGN PATENT DOCUMENTS

| DE | 199 53 787 A1 | 5/2001 |
|---|---|---|
| EP | 1 103 398 A1 | 5/2001 |
| EP | 1 205 332 A1 | 5/2002 |
| EP | 1 319 579 A1 | 6/2003 |
| JP | 2002-219951 A | 8/2002 |
| WO | WO 03/046457 A1 | 6/2003 |
| WO | WO 2004/042292 A1 | 5/2004 |

* cited by examiner

*Primary Examiner*—Teresa J. Walberg
(74) *Attorney, Agent, or Firm*—Foley & Lardner LLP

(57) ABSTRACT

A heat exchanger for a motor vehicle, in particular a coolant/air cooler (2'), is designed to be fastened to a lower support and an upper transverse support in the motor vehicle by means of upper and lower fastening elements. The heat exchanger (2') has at least one plastic collecting tank (6', 7') onto which the fastening elements can be injection molded. The fastening elements (10', 11', 12', 13') can be produced with different positions and/or different dimensions, e.g., two positions and/or two dimensions. An injection molding die having interchangeable inserts is preferably employed to produce a series of header tanks differing only in the positions and/or dimensions of the fastening elements.

12 Claims, 4 Drawing Sheets

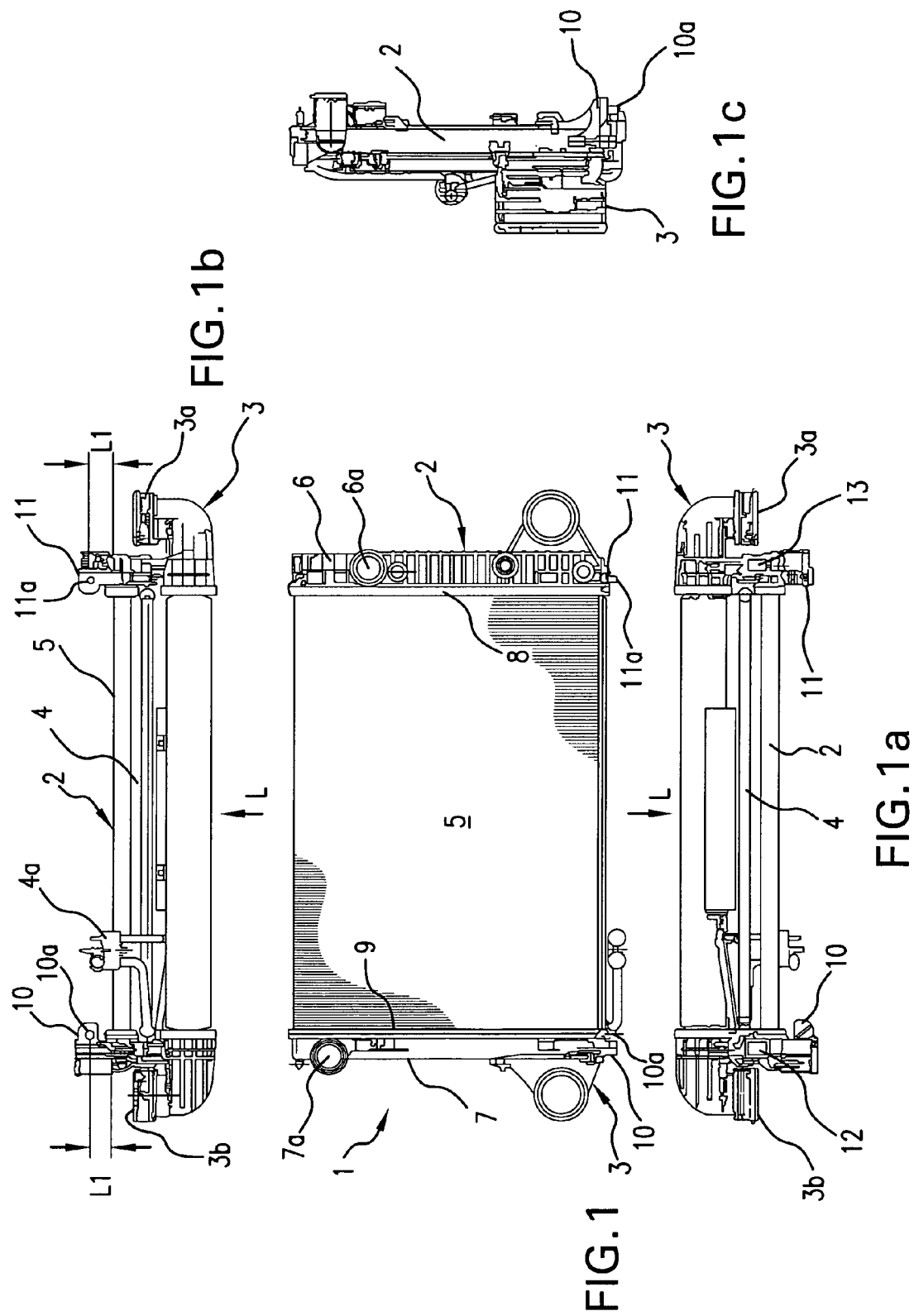

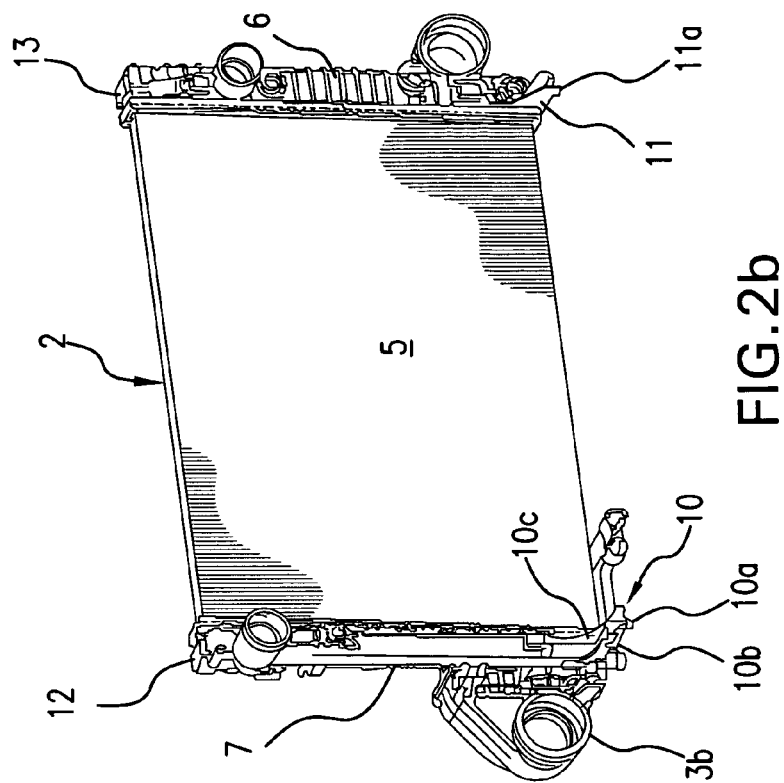
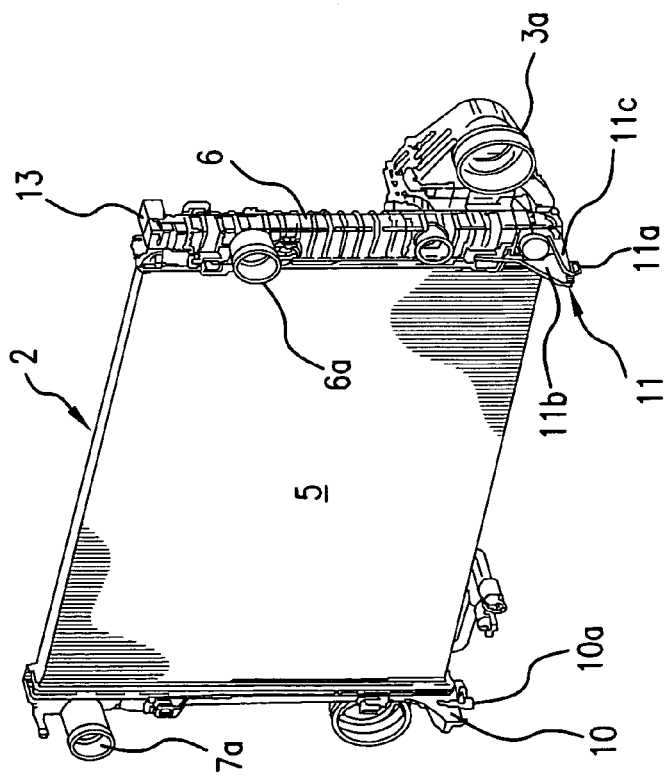

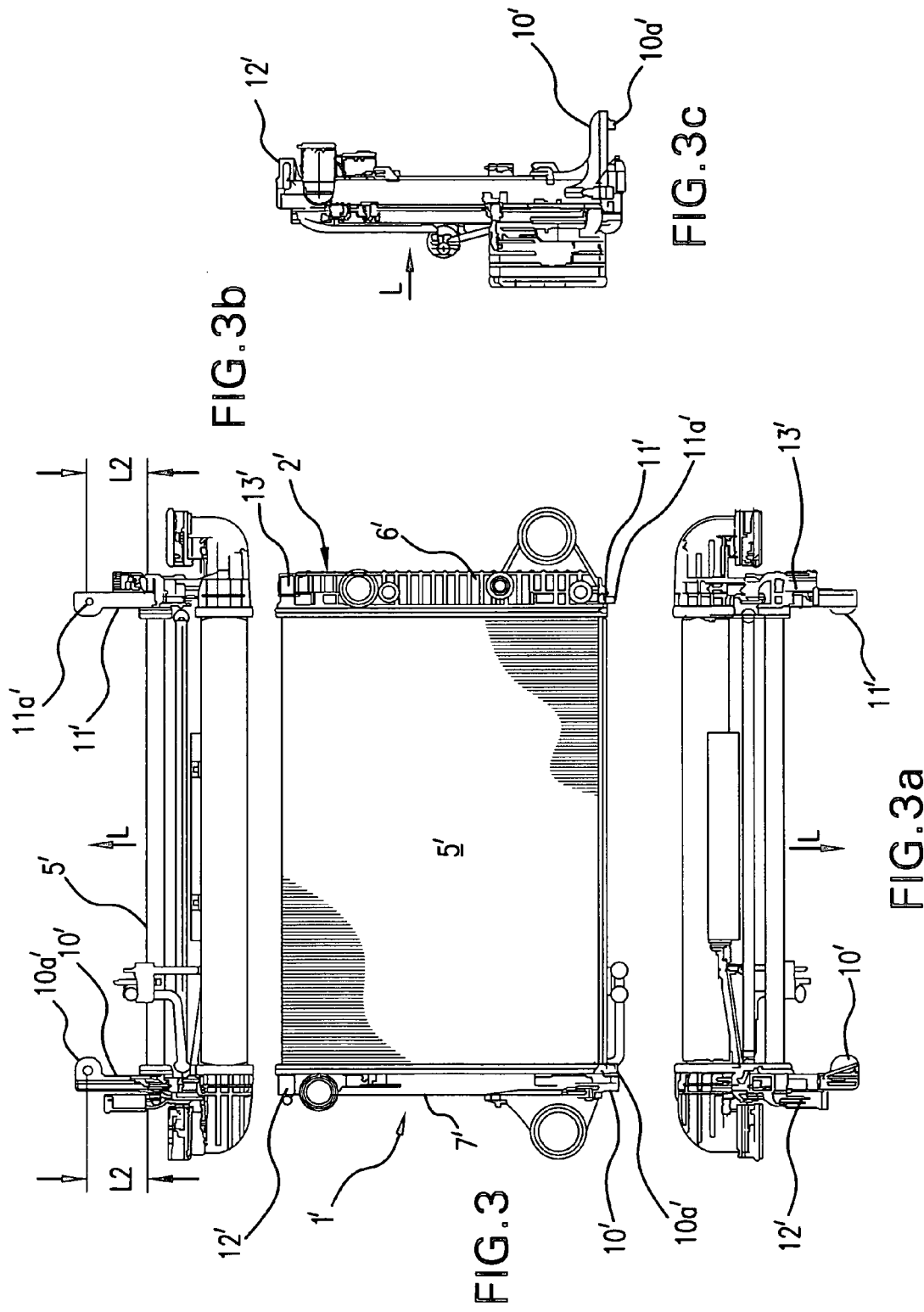

HEAT EXCHANGER FOR A MOTOR VEHICLE, IN PARTICULAR COOLANT/AIR COOLER

CROSS-REFERENCE TO RELATED PATENT APPLICATIONS

The right of priority is claimed under 35 U.S.C. §119(a) based on Federal Republic of Germany Application No. 103 47 679.2, filed Oct. 9, 2003, the entire disclosure of which is hereby incorporated by reference, including the specification, drawings, claims and abstract.

BACKGROUND OF THE INVENTION

The invention relates to a heat exchanger for a motor vehicle, in particular a coolant/air cooler.

Heat exchangers for motor vehicles, such as coolant/air coolers, charge-air/air coolers, refrigerant/air condensers and/or oil/air coolers are usually arranged in the front engine compartment of the motor vehicle, and the above-mentioned heat exchangers are frequently combined to form a preassembled cooling module. DE 199 53 787 A1 discloses a cooling module of this type, comprising a coolant/air cooler, a charge-air/air cooler and a refrigerant/air condenser. The heat exchangers are connected fixedly to one another to form a constructional unit which is inserted into the vehicle and is fastened there. For fastening, one of the heat exchangers has fastening elements which are typically arranged on collecting tanks produced from plastic, for example, fastening pins on the lower side of the heat exchanger and fastening openings on the upper side. The heat exchanger or the complete cooling module is held elastically by means of its fastening pins on a body part, for example, a transverse support, and is fastened on the upper side to a lock transverse support of the vehicle. The heat exchanger and/or cooling module is therefore fastened essentially to four points in the vehicle.

In many types of vehicle, a technical problem arises if the same heat exchanger or the same cooling module is to be fitted at multiple different positions or placements in a vehicle, with the fastening points in the vehicle remaining the same. The invention is based on these problems.

SUMMARY OF THE INVENTION

It is therefore one object of the present invention to provide an improved heat exchanger of the type mentioned at the beginning, either individually or as part of a cooling module that can be fit at different positions in the vehicle with the same fastening points.

In particular, it is an object of the invention to provide such a heat exchanger that can be fit as far as possible without additional parts and without additional production costs.

Another object of the invention resides in providing an improved series of heat exchangers that are the same except for a plurality of different mounting element configurations, as well as a method for producing such a series of heat exchangers.

In accordance with one aspect of the invention, there has been provided a heat exchanger for use in a motor vehicle having a lower support and an upper transverse support, the heat exchanger comprising: a pair of injection molded collecting tanks; upper and lower fastening elements for fastening the heat exchanger to the lower support and the upper transverse support in the motor vehicle, wherein the upper and lower fastening elements are injection molded onto the plastic collecting tanks, and wherein the fastening elements have one of a plurality of different positions and/or one of a plurality of different dimensions that are produced by means of a single injection molding die for the plastic collecting tanks, whereby the same heat exchanger can be adapted for fastening in vehicles having different fastening arrangements and/or different positioning requirements for the heat exchanger.

In accordance with another aspect of the invention, there is provided a heat exchanger for use in a motor vehicle having a lower support and an upper transverse support, the heat exchanger comprising: at least injection molded collecting tank; upper and lower fastening elements for fastening the heat exchanger to the lower support and the upper transverse support in the motor vehicle, wherein at least one of the upper and lower fastening elements is injection molded onto the plastic collecting tank, and wherein said at least one fastening element has one of a plurality of different positions and/or one of a plurality of different dimensions that are produced by means of a single injection molding die for the plastic collecting tank, whereby the same heat exchanger can be adapted for fastening in vehicles having different fastening arrangements and/or different positioning requirements for the heat exchanger.

In accordance with another aspect of the invention, there is provided a method for manufacturing a series of heat exchangers for mounting in a series of motor vehicles having a lower support and an upper transverse support for the heat exchanger, wherein the series of motor vehicles includes more than one different support configuration for the heat exchanger, wherein the heat exchangers include at least one injection molded collecting tank, upper and lower supporting elements and a block of tubes connected to the collecting tank, the method comprising: injection molding said collecting tank for the series of heat exchangers, employing an injection molding die having a single design, whereby each collecting tank of said series of heat exchangers is of uniform tank size and heat exchanger design, wherein prior to said injection molding step, one of a plurality of different inserts is placed in said die to selectively form on said tank, for one of said support configurations, either the upper and/or the lower supporting elements; and assembling the collecting tank with an identical tube block for the entire series of heat exchangers.

Finally, there is also provide a series of heat exchangers having the characteristics of the series of heat exchangers made by the method defined above.

Further objects, features and advantages of the present invention will become apparent from the detailed description of preferred embodiments that follows, when considered together with the accompanying figures of drawing.

BRIEF DESCRIPTION OF THE DRAWINGS

An exemplary preferred embodiment of the invention is illustrated in the drawings and will be described in greater detail below. In the drawings.

FIGS. 1, 1a, 1b, 1c are, respectively a front view, a plan view, a bottom view and a side view, showing a first type of cooling module according to the invention;

FIGS. 2a, 2b are two different perspective illustrations showing a coolant cooler of the cooling module with fastening elements;

FIGS. 3, 3a, 3b, 3c are, respectively, a front view, a plan view, a bottom view and a side view showing a second type of cooling module with changed fastening elements.

DETAILED DESCRIPTION OF THE PREFERRED EMBODIMENTS

Figure 4A:
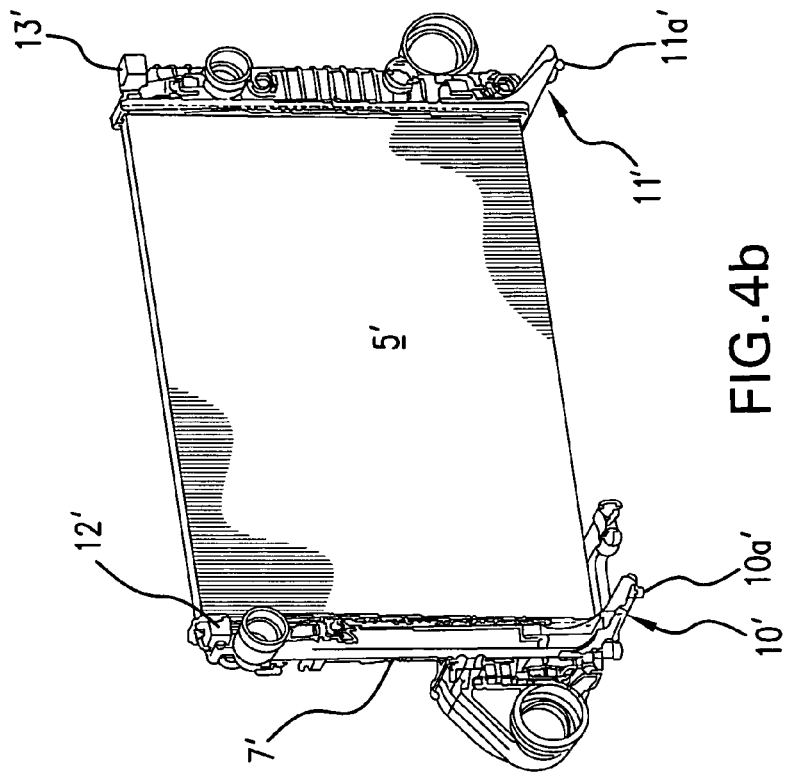
FIGS. 4a, 4b are two different perspective illustrations showing the coolant cooler of the cooling module according to FIG. 3, with changed fastening elements.

According to the invention, provision is made for fastening elements, that can be injection molded on the collecting tanks of the heat exchanger, to be able to be produced in different positions and/or dimensions, i.e., the entire heat exchanger including its collecting tanks remains the same, with only the fastening elements being designed differently and matched to the different fitting conditions. This affords the advantage that no additional fastening elements are required in order to fasten the heat exchanger in another position in the vehicle. This saves costs, storage and installation time, and simplifies the installation, since the installation takes place virtually in the same manner in both cases.

In one preferred alternative embodiment of the invention, the different fastening elements are produced by the use of "interchangeable inserts" on the injection molding die. The injection molding die for injection molding the collecting tank is equipped with different interchangeable inserts which are matched specially to the different dimensions and/or positions of the fastening elements, so that the rest of the die remains the same. This affords the advantage that one injection molding die can be used to produce collecting tanks having different fastening elements, with the collecting tanks being the same (or at least substantially the same), except for the fastening elements. This saves production costs, in particular the cost of a completely separate second die.

In a further preferred embodiment of the invention, the fastening elements are designed as holders having an L-profile, one (vertical) L-limb being integrated in the wall of the collecting tank and the other (horizontal) L-limb protruding from the collecting tank and forming a foot for the fastening of the heat exchanger. This foot has different lengths, depending on what is required for fitting in the vehicle. This achieves the advantage that the heat exchanger, for example, as seen in the direction of travel of the vehicle, can be fastened at different positions, for example 5 cm farther forward, with the same fastening points fixed on the vehicle.

In a further preferred embodiment of the invention, the L-limbs are stiffened by ribs, with the result that a U-profile having an increased moment of resistance is produced in cross section. The L-profile stiffened by ribs is suitable, in particular, for absorbing bending stresses which occur to an increased extent as the foot portion increases in length.

In a further preferred embodiment of the invention, the upper fastening elements on the collecting tanks are designed as open tank profiles, which can be injection molded onto different positions of the collecting tank, for example, on the front side versus on the rear side. This can likewise be accomplished, in a preferred embodiment, by interchanging the interchangeable inserts in the injection molding die. The upper fastening elements are used to fasten the heat exchanger or the cooling module to the upper transverse support of the vehicle, e.g., by fastening pins which are fixed on the vehicle and engage in the tank profiles. The advantage achieved by the different positions is that the heat exchanger can also be fastened by means of its upper fastening elements at different positions or placements of the heat exchanger in the motor vehicle, with the same fastening points on the vehicle. This ensures a stable securing at four points.

In a further preferred embodiment of the invention, the heat exchanger with the fastening elements serves as a support for further heat exchangers, such as, for example, a charge-air cooler and/or a refrigerant condenser, which are arranged, as seen in the direction of airflow, upstream or downstream of the heat exchanger which in this case is designed as a coolant/air cooler. The coolant/air cooler with the fastening elements according to the invention therefore serves as a support for the entire cooling module.

Turning now to the drawings, FIGS. 1, 1a, 1b and 1c show different views of a cooling module 1 which is constructed from a coolant cooler 2, a charge-air cooler 3 and a refrigerant condenser 4 arranged between them. The heat exchangers 2, 3, 4 are connected mechanically to one another in a conventional manner that need not be explained in greater detail here, to form a subassembly, i.e., the cooling "module" 1. The coolant cooler 2, which acts as a support for the entire cooling module 1, can be of any desired configuration and construction. One preferred coolant cooler has a network (block) 5 soldered from flat tubes and corrugated fins (not illustrated in detail) and two laterally arranged plastic collecting tanks 6, 7 which are in each case connected mechanically to a metallic tube header plate 8, 9. The tubes (not illustrated in detail) of the block 5 lead into the header plates 8, 9 and are brazed in a sealed and fixed manner to them. The coolant cooler 2 is designed as a "cross-flow cooler", i.e., is fitted in the vehicle (not illustrated in detail) with tubes lying horizontally and collecting tanks 6, 7 standing vertically. The collecting tanks 6, 7, respectively, have a coolant outlet stub 6a and a coolant inlet stub 7a via which the connection to a coolant circuit (not illustrated in detail) takes place. In an analogous manner, the charge-air cooler 3, which has charge-air stubs 3a, 3b, is connected to a charge-air system (not illustrated in further detail), and the coolant condenser 4 is connected via a connecting flange 4a to a refrigerant circuit (not illustrated in further detail) of a vehicle air conditioning system. The cooling module 1 has ambient air flowing through it in the direction of the arrows L. The individual components, the systems containing the heat exchanger(s) and their combination in the manner described are conventional and therefore do not require further illustrated details and/or description. See, e.g., WO 2003/046457 (charge air cooler and cooling system including a charge air cooler) and WO 2004/042292 (refrigerant condenser and refrigerant circuit including a condenser), the entire disclosure of which is hereby incorporated by reference.

The cooling module 1 is supported via lower fastening elements 10, 11 and upper fastening elements 12, 13 (FIG. 1a) which are preferably injection molded in each case onto the coolant tanks 6, 7, i.e., are formed integrally therewith and preferably are made of plastic. The lower fastening elements 10, 11 are preferably designed as L-profiles, and on their lower side have a respective fastening pin 10a, 11a by means of which the cooling module 1 is fixed to a transverse support (not illustrated in detail) of the vehicle, preferably mounted in elastic receiving bushings (not illustrated in detail). The distance, as seen in the direction of travel, between the fastening pins 10a, 11a and the rear surface of the cooler block 5 is indicated by L1. The upper fastening elements 12, 13 are preferably designed as opened tank profiles, which are held on an upper lock transverse support (not illustrated in detail) of the vehicle. A fastening at four points in the vehicle is therefore produced for the entire cooling module 1.

FIGS. 2a and 2b show two different perspective illustrations of the coolant cooler 2 according to FIG. 1, as seen in the direction of travel, i.e., in the direction of the air outlet side of the block 5 and the open sides of the coolant stubs 6a, 7a and the charge-air stubs 3a, 3b. The fastening element 11 is preferably injection molded onto the coolant tank 6 in the form of an L-profile, i.e., in the form of a horizontally protruding foot which is stiffened by two lateral ribs 11b, 11c. In a similar manner, the fastening element 10, likewise in the form of an L-profile, is also preferably injection molded onto the coolant tank 7. It is also possible here to see a horizontally protruding foot with stiffening ribs 10b, 10c. The fastening pins 10a, 11a, which serve to absorb horizontal shearing forces, are respectively also respectively injection molded onto the lower side of the two feet 10, 11. The upwardly open tank profile 12, 13 is arranged at the upper end of the coolant tanks 6 and 7, specifically in each case on the front side (air upstream side) thereof, as seen in the direction of travel.

FIGS. 3, 3a, 3b and 3c show various views, namely, from the front, from above, from below and from the side of a second type of cooling module 1', which differs from the previously described cooling module 1 only by virtue of the dimensions and the positions of the fastening elements 10', 11', 12', 13'. Otherwise, this cooling module 1' corresponds to the cooling module 1 in respect of the number, size and design of the heat exchangers. In FIG. 3b, the distance of the fastening pins 10a', 11a' from the rear surface 5' of the coolant cooler 2 is denoted by L2. In a comparison with FIG. 1b for the cooling module 1, it is apparent that distance L2 is considerably larger than distance L1. However, the ratio L2/L1 which arises here from the graphical illustration is selected arbitrarily and can be varied, as needed, upwardly or downwardly, for example, by extending or shortening the foot 10', 11'. The further views in FIG. 3a and FIG. 3c likewise show the enlarged size L2 in comparison to the first embodiment of the cooling module 1. The upper fastening points are also analogously offset, i.e., in the case of the cooling module 1' or in the case of the coolant cooler 2', the fastening elements 12', 13' are situated on the rear side of the coolant tanks 6', 7', i.e., on the side of the air outlet surface 5'. The direction of flow of the air through the cooling module 1' is indicated by arrows L (the direction of travel of the motor vehicle is in the opposite direction).

Figure 4B:
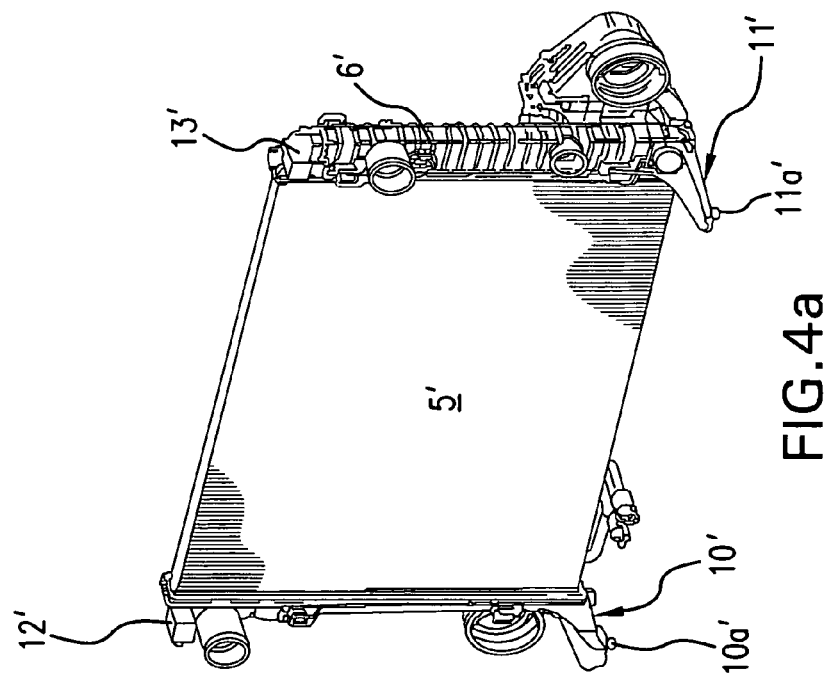

FIGS. 4a and 4b show two different perspective illustrations of the coolant cooler 2' with a view of its rear end surface 5' on the air outlet side. The different lengths of the feet or fastening elements 10', 11' in comparison to FIGS. 2a and, 2b are also seen here in the perspective illustration. Similarly, the different positions of the upper fastening elements 12' and 13', which are arranged here on the rear side of the coolant tanks 6', 7', are seen. They are therefore preferably offset with respect to the first type of cooling module 1 approximately by the same amount in the direction of airflow as the fastening pins 10a', 11a'.

The change in the dimensions of the lower fastening elements, from L1 to L2; and the change in the positions of the upper fastening elements 12', 13', from the front side to the rear side, has the effect during the fitting of the cooling module that the cooling module 1' moves forward in the direction of travel in the vehicle by the difference L2–L1, as already mentioned with the same fastening points in the vehicle, i.e., on the lower and upper transverse support.

The collecting tanks 6, 7 and 6', 7' are produced in each case in the same injection molding die; however, "interchangeable inserts" for the fastening elements 10, 11, 12, 13 and 10', 11', 12', 13' are used. In this respect, just one injection mold having four interchangeable inserts is required for the two coolant tanks 6 and 6', and similarly just one injection mold for the two coolant tanks 7 and 7'. In principle, a plurality of interchangeable inserts are also possible if further variations or gradations are desired.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A method for manufacturing a series of heat exchangers for mounting in a series of motor vehicles having a lower support and an upper transverse support for the heat exchanger, wherein the series of motor vehicles includes more than one different support configuration for the heat exchanger, wherein the heat exchangers include at least one injection molded collecting tank, upper and lower supporting elements and a block of tubes connected to the collecting tank, the method comprising:

injection molding said collecting tank for the series of heat exchangers, employing an injection molding die having a single design, whereby each collecting tank of said series of heat exchangers is of uniform tank size and heat exchanger design, wherein prior to said injection molding step, one of a plurality of different inserts is placed in said die to selectively form on said tank, for one of said support configurations, either the upper and/or the lower supporting elements; and assembling the collecting tank with an identical tube block for the entire series of heat exchangers.

2. A method as claimed in claim 1, wherein the lower fastening elements comprise holders having an L-profile.

3. A method as claimed in claim 2, wherein one L-limb protrudes from the collecting tank and the other L-limb merges into the collecting tank, and wherein the protruding L-limb can selectively have one of a plurality of different lengths.

4. A method as claimed in claim 3, wherein the protruding L-limb further comprises stiffening ribs which form a U-profile.

5. A method as claimed in claim 2, further comprising a holding pin arranged on the protruding limb.

6. A method as claimed in claim 5, wherein the upper fastening elements are selectively arranged in one of a plurality of alternative different positions on the collecting tank.

7. A method as claimed in claim 6, wherein the alternative positions comprise opposite longitudinal sides of the collecting tanks.

8. A method as claimed in claim 1, wherein the heat exchanger comprise an engine coolant/air cooler in combination with at least one second heat exchanger, to form a cooling module.

9. A method as claimed in claim 8, wherein said second heat exchanger comprises a charge-air/air cooler and/or a refrigerant/air condenser.

10. A method as claimed in claim 1, wherein the heat exchanger comprises an engine coolant cooler designed as a cross-flow heat exchanger with collecting tanks arranged laterally and vertically.

11. A series of heat exchangers for mounting in a series of motor vehicles having a lower support and an upper transverse support for the heat exchanger, wherein the series of motor vehicles includes more than one different support configuration for the heat exchanger, the heat exchangers of the series being different and comprising at least one injection molded collecting tank, upper and lower supporting elements and a block of tubes connected to the collecting tank, said collecting tank for the series of heat exchangers being injection molded using an injection molding die having a single design, whereby each collecting tank of said series of heat exchangers is of uniform tank size and heat exchanger design, with either the upper and/or the lower supporting elements selectively formed on said tank, in said single design molding die, to match one of said support configurations.

12. A series of heat exchangers as claimed in claim 11, manufactured by the method as claimed in claim 1.

\* \* \* \* \*